Feb. 21, 1967   E. E. KOCH ETAL   3,304,699
HARVESTER HEADER CONSTRUCTION
Filed Aug. 11, 1964   3 Sheets-Sheet 1
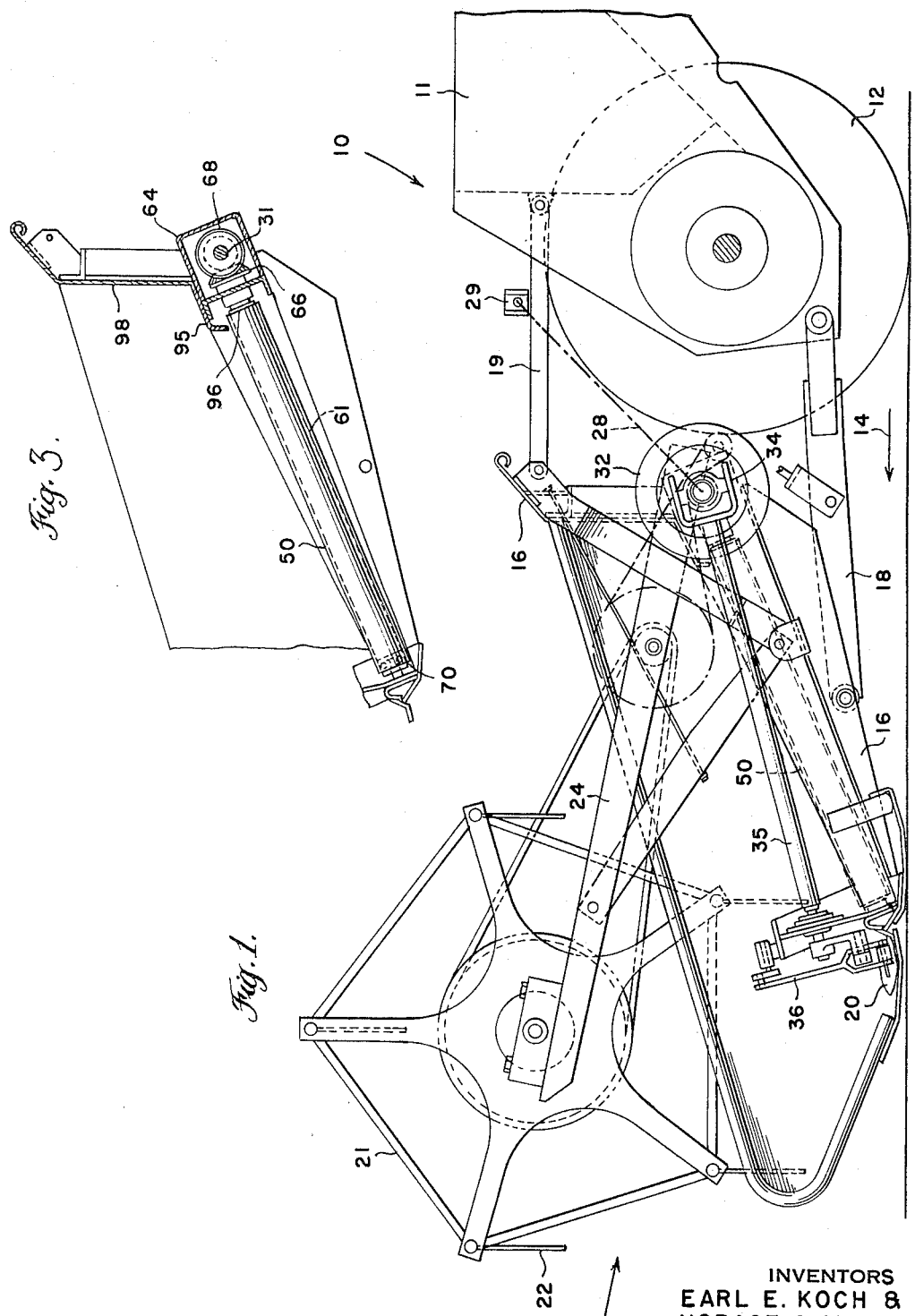
INVENTORS
EARL E. KOCH &
HORACE G. MCCARTY
BY Joseph A. Brown
ATTORNEY

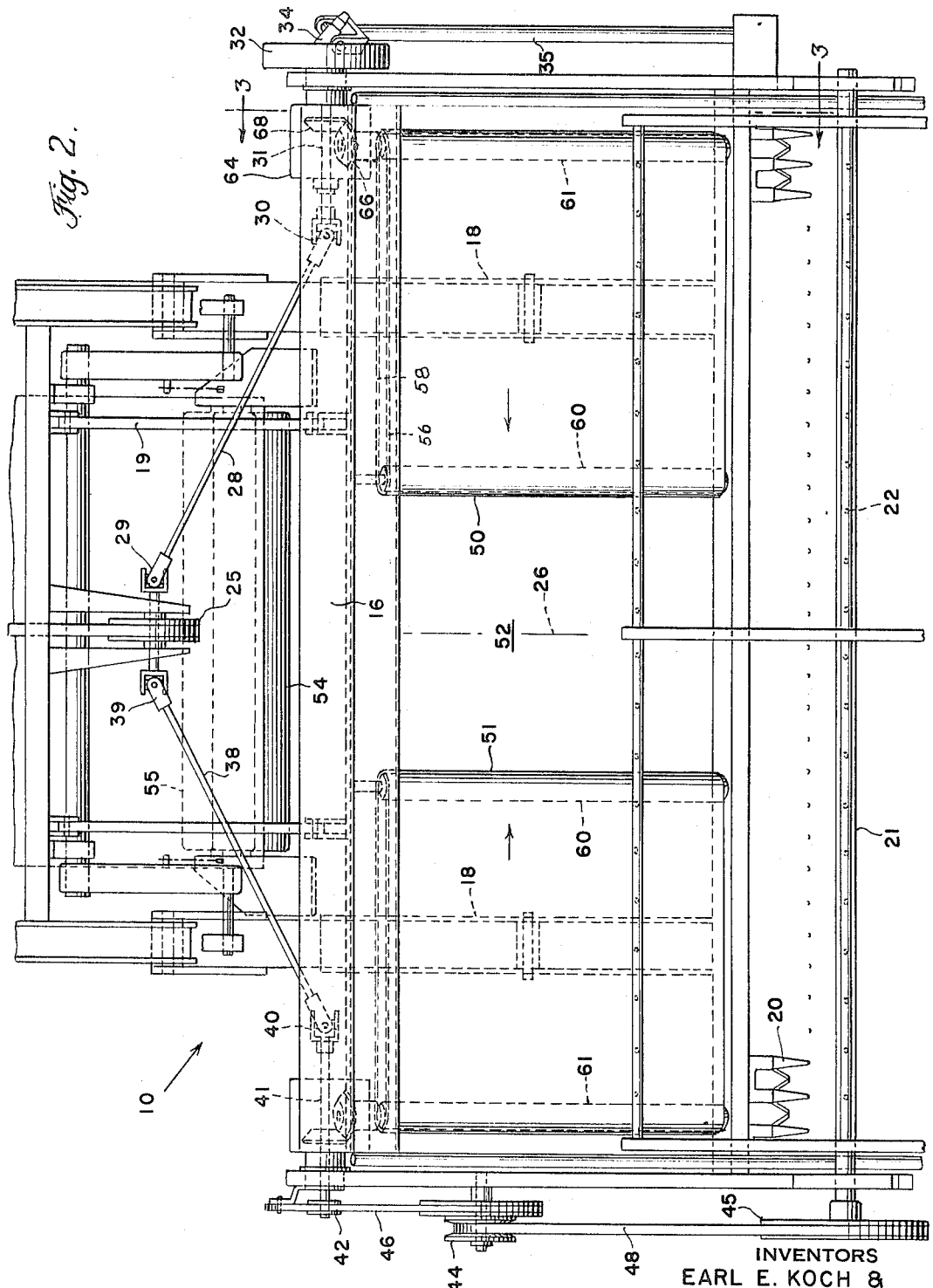

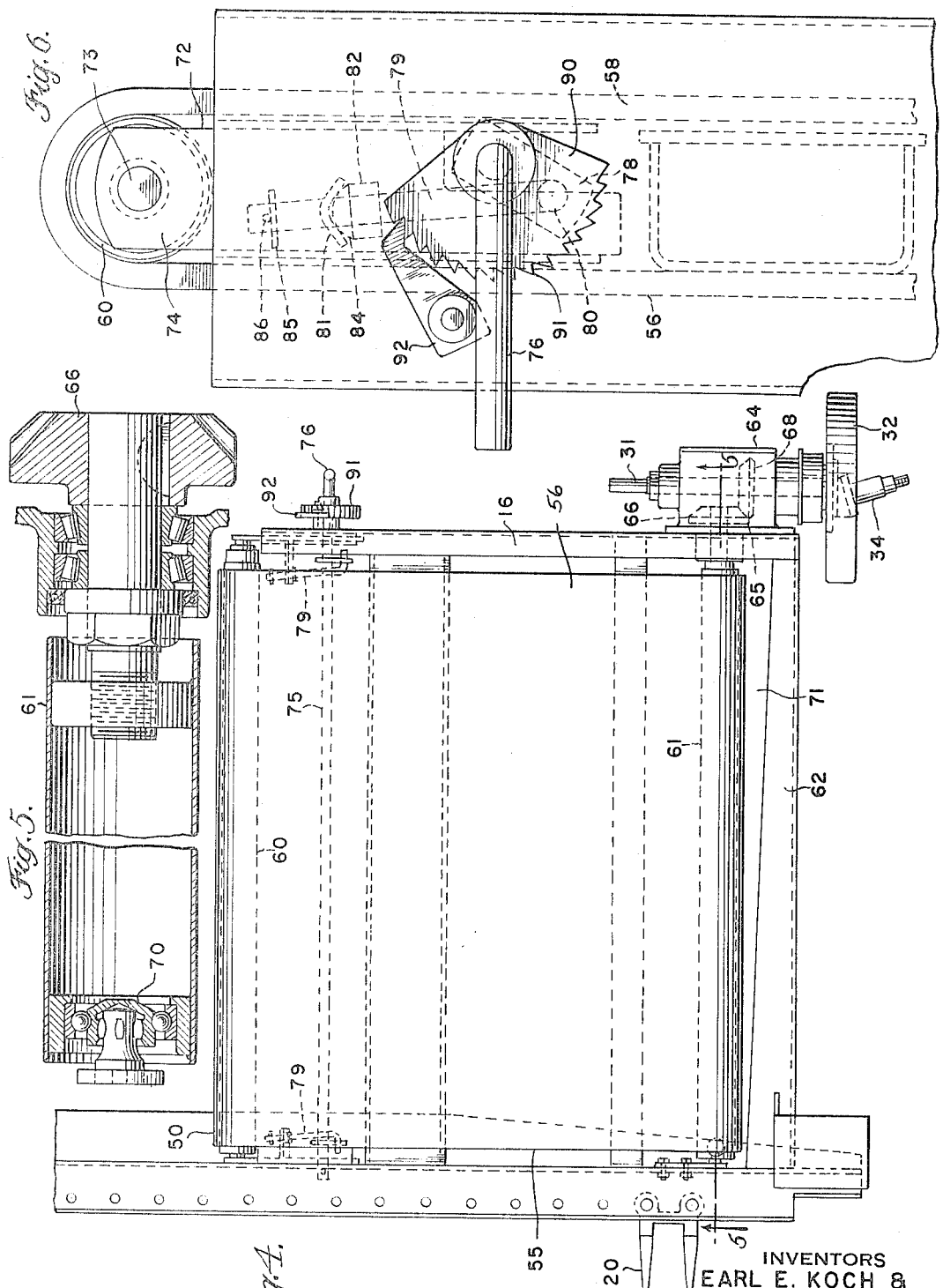

United States Patent Office 3,304,699
Patented Feb. 21, 1967

3,304,699
HARVESTER HEADER CONSTRUCTION
Earl E. Koch, Mohnton, and Horace G. McCarty, New Holland, Pa., assignors to Sperry Rand Corporation, New Holland, Pa., a corporation of Delaware
Filed Aug. 11, 1964, Ser. No. 388,773
4 Claims. (Cl. 56—23)

This invention relates to windrowers or swathers, and more particularly to an improved draper header construction for a windrower.

The conventional draper header for a windrower has a pair of endless conveyors which operate to deliver cut crop material toward each other for deposit in a space between them. Each conveyor comprises a wide endless belt which travels around a pair of laterally spaced, fore-and-aft extending, inclined rollers. The forward ends of the rollers are closer to the ground than the rearward ends. The inboard roller of each pair is the drive roller whereby the upper reach of each endless belt is tight and on the drive side and the lower reach of each belt is on the slack side. The roller adjacent the outside of the header is adjustable toward and away from the inboard roller whereby the tightness of the belt may be controlled.

To obtain maximum effective use of the draper conveyors, they are unobstructed throughout their lateral extensions and their outer ends are spaced from the header frame. When an outer roller of a conveyor is adjusted inwardly to regulate belt tightness, the space between the roller and the header frame increases. This causes problems in certain crops because of the tendency of some materials to get between the conveyor and the frame. Further, problems are presented in regard to the adjustable roller to maintain it in parallel relation to its associated roller and then to lock the roller in adjusted position.

The main object of this invention is to provide an improved draper header construction for a windrower.

Another object of this invention is to provide a windrower draper header wherein the relation of the outside roller of the draper conveyors to the header frame is fixed and therefore the relation of the outside ends of the draper to the frame remains constant.

Another object of this invention is to provide a windrower draper of improved structure wherein an adjustable roller is maintained in parallel relation to a fixed roller regardless of the position of adjustment of the adjustable roller.

A further object of this invention is to provide a windrower draper header having a novel drive and adjustment combination arrangement.

Other objects of this invention will be apparent hereinafter from the specification and from the recital in the appended claims.

In the drawings:

FIG. 1 is a fragmentary side elevational view of the header of a windrower having draper conveyors driven, mounted and adjustable according to this invention;

FIG. 2 is a plan view of FIG. 1;

FIG. 3 is a fragmentary vertical section taken on the line 3—3 of FIG. 2 looking in the direction of the arrows and showing one of the draper conveyor drives and the header shelf used in combination with the conveyors;

FIG. 4 is an enlarged plan view of one of the draper conveyors and showing in particular the belt tightener structure thereon and the drive for the draper conveyor;

FIG. 5 is a fragmentary section on a substantially enlarged scale of the outside roller of FIG. 4 and taking generally along the line 5—5 looking in the direction of the arrows; and FIG. 6 is an enlarged side view of one end of the draper conveyor and the tightener device therefor.

Referring now to the drawings by numerals of reference and first to FIGS. 1 and 2, 10 denotes generally a windrower having a tractor unit 11 supported on ground wheels one of which is shown at 12 for travel in a forward direction indicated by the arrow 14. Tractor unit 11 carries a header 15 having a frame 16. Frame 16 is supported on a pair of lift arms 18 which engages the bottom of the header frame, and arms 19 which engage the upper portion of the frame.

At the lower forward end of header frame 16, a sickle 20 is provided which extends transversely to the line of travel of the machine and extends from one end to the other of the header. Above the sickle 20 is a reel 21 rotatable in a counterclockwise direction when viewed as shown in FIG. 1 and having tines 22 which sweep standing crop material rearwardly and over the sickle 20. The reel is rotatably carried on support arms 24 which extend upwardly and forwardly from rearward portions of header frame 16.

As shown in FIG. 2, a drive sheave or wheel 25 is provided on tractor unit 11 and rotatable in a vertical plane along the longitudinal medial plane 26 of the machine. One side of the drive sheave 25 is connected to a diagonally extending drive shaft 28 through a universal joint 29. The other end of shaft 28 has a universal joint 30 which drives a transverse shaft 31. Shaft 31 has a flywheel 32 and a conventional wobble drive unit 34 which changes rotatable movement to oscillating movement and transmits such force through a shaft 35 to reciprocate sickle 20 through a drive mechanism shown at 36. The opposite end of drive sheave 25 drives a shaft 38 and connected to it through a universal joint 39. Shaft 38 extends diagonally toward the opposite side of the machine and is connected by a universal joint 40 to a transverse shaft 41. Shaft 41 operates through pulleys 42, 44 and 45 and drive belts 46 and 48 to rotate reel 21.

Mounted on header frame 16 are draper conveyors 50 and 51 located as shown best in FIG. 2. The draper conveyor 50 is positioned along the left side of the machine facing forwardly relative to the direction of travel and the draper conveyor 51 is along the right side. Conveyor 50 operates to deliver crop material inwardly toward a space 52 between the conveyors and the other conveyor delivers its material in the same direction. The combined material is deposited on the ground then passes between a pair of crusher rollers 54 and 55 shown in FIG. 2. Such crushing of the material is used to facilitate driving prior to final deposit of the material in a windrow.

Both conveyors are of the same design and construction. Therefore, the construction of conveyor 50 only will be described, it being understood that the conveyor 51 is similarly constructed. As shown in FIG. 4, conveyor 50 has a wide endless belt or apron 55 having an upper reach 56 and a lower reach 58. Belt 55 extends around an inside roller 60 adjacent space 52 and an outside roller 61 adjacent frame member 62 on the header frame 16. The rollers 60 and 61 extend in a fore-and-aft direction relative to the travel of the machine and they are located parallel to each other. As shown in FIGS. 1 and 3, the rollers are inclined, having their forward ends closer to the ground than their rearward ends.

Conveyor 50 is driven from the outboard roller 61 through a gearbox 64 having bevel gears 65. One of the bevel gears 66 is connected to the upper rearward end of roller 61 and the other bevel gear 68 is affixed to shaft 31. It will be noted that the bevel gear 68 is located on the side of gear 66 remote from the space 52. By driving conveyor 50 from the outside roller the lower reach 58 is the tight and drive side of the belt while the upper reach 56 is the slack side. The upper reach travels toward the center space 52 between the conveyors.

As shown in FIG. 5, lower forward end roller 61 is rockably mounted on a roll alignment adjuster bearing 70 so that in the assembly of the draper conveyors on the header frame, the roll 61 may be properly positioned. When adjusted, roll 61 rotates on a fixed fore-and-aft axis relative to the frame 16 whereby the space 71 (FIG. 4) between the outboard end of conveyor 50 and the side frame member 62 of the header frame remains constant. The roller 60 of conveyor 50 is supported for adjustment toward and away from the roller 61 so that the tightness of the belt 55 may be adjusted as required. Each end of roller 60 is carried on a supporting plate 72 which is slidable in a direction transverse to the axis of the roll. One end 74 of each plate rotatably journals a shaft 73 of the roller and the plate extends toward the other roller 61 and between the reaches 56 and 58 of belt 55. The support plates 72 are adjusted relative to the header frame by means of a rod 75 which extends parallel to roller 60 and between the reaches of the endless belt. The ends of rods 75 project through suitable openings in the header frame whereby the rod is maintained for rotatable adjustment about a fixed axis. At its upper rearward end, rod 75 has a handle 76 and adjacent to it is a lever arm 78. Arm 78 is fixed to and extends radially from rod 75 and is connected by a link 79 to the adjacent support plate 72. Link 79 is pivotally connected at 80 to the lever 78 and its opposite end projects through a collar 81 affixed to plate 72, Link 79 has a nut 82 threaded onto it and provides a stop 84 engageable with collar 81. The terminal end of link 79 extends through a bracket 85 and a cotter pin is provided at 86.

When viewed as shown in FIG. 6 and when the handle 76 is pivoted in a clockwise direction, link 79 is shifted axially toward roller 60 whereby the plate 72 is shifted in the header frame and the roller 60 is moved away from the roller 61 to tighten belt 55. When the handle 76 is pivoted in the counterclockwise direction, the engagement of cotter pin 86 with bracket 85 pulls the plate 72 toward roller 61 and belt 55 is slackened. To maintain the belt in adjusted position, a ratchet plate 90 is provided having teeth 91 engaged by a pawl 92 pivoted on header frame 16. The pawl is manually adjusted into and out of engagement with the ratchet wheel.

With the rod 75 rotatable on a fixed axis and with the adjustment structure duplicated at both ends of the rod, when one end of roller 60 is adjusted away from roller 61 the opposite end is correspondingly adjusted. In this way, roller 60 is maintained in parallel relation to the other roller. The ratchet mechanism is provided at the rearward end only of rod 75 to hold the structure in desired adjusted position.

To keep the crop material on the conveyors 50 and 51 from passing over the top of the header construction before the center space 52 is reached, a shelf 95 is provided as shown in FIG. 3. Such shelf extends downwardly and forwardly over the upper edge 96 of each conveyor and in front of a vertical wall 98 forming part of the header frame 16. With this arrangement, the conveyors are unobstructed in a lateral direction for their entire length. The forward and rearward marginal edges are guarded to prevent material from entering between the reaches of the belts.

It will be noted that with the draper construction described, adjustment of the conveyors to regulate the tightness of their respective belts will increase or decrease the size of the space 52. However, the space between the conveyors and the header frame at the outside of the structure will remain constant. The variation in the depositing space for the material does not adversely affect the operation of the machine. However, adjusting the outboard roller of either conveyor belt relative to the frame may cause problems in certain crop materials because if the space becomes too large, material will wedge into the space. Further, by having the draper conveyors driven through bevel gear boxes fixedly mounted on the frame 16, an appropriate drive is provided to each conveyor section which will have long life and handle the strenuous conveying and load problems presented.

While this invention has been described in connection with a particular embodiment thereof, it will be understood that it is capable of modification, and this application is intended to cover any variations, uses or adaptations following, in general, the principles of the invention and including such departures from the present disclosure as come within known or customary practice in the art to which the invention pertains, and as fall within the scope of the invention or the limits of the appended claims.

Having thus described our invention what we claim is:

1. A windrower comprising, in combination, a tractor unit supported on wheels for ground travel forwardly, a header in front of said tractor unit and carried thereon, said header having a frame, a first draper conveyor on one side of said frame, a second draper conveyor on the opposite side of said frame, said conveyors being laterally spaced relative to each other to define a space to receive discharged crop material, both conveyors being inclined and having a forward end closer to the ground than a rearward end, each conveyor comprising an outside roller remote from said space and extending in a fore-and-aft direction, an inboard roller adjacent said space and extending parallel to said outside roller, an endless belt extending around said rollers, means supporting said outside roller for rotation in a given location relative to said frame, a gear box on said frame and drivingly connected to a rearward end of said outside roller, power means connected to said gear box to drive said outside roller in such direction that an upper reach of said endless belt travels toward said space, said upper reach being on the slack side of said endless belt and the lower reach of the belt being on the tight side, a pair of supporting plates, one on each end of said inboard roller and slidable on said frame for movement toward and away from said outside roller to control the tightness of said belt, a rod between the reaches of said belt and extending adjacent and parallel to said inboard roller, said rod extending through said header frame and being rotatably adjustable in a fixed location relative thereto, a pair of lever arms on said rod, one adjacent each end of said inboard roller, a pair of links each having one end pivotally connected to one end to one of said lever arms and an opposite end connected to the adjacent roller supporting plate, whereby when said rod is rotated said lever arms are pivoted to shift said links and thereby slidably move said plates on said frame, and a ratchet and pawl operatively associated with said rod to provide means for releasably holding and supporting plates in adjusted position.

2. A windrower as recited in claim 1 wherein each link extends through a fixed collar on its associated supporting plate, and a collar engaging stop threaded on each link and located between the associated collar and lever to vary the adjustment of the supporting plate.

3. A windrower as recited in claim 1 wherein said header frame has a transverse shelf projecting forwardly and downwardly over an upper rearward transverse edge of each draper conveyor.

4. A windrower as recited in claim 1 wherein said gear box has a pair of bevel gears, one gear being affixed to the upper rearward end of said outside roller and the other gear being rotatable about a transverse axis, said other gear engaging said one gear in a location remote from said inboard roller.

References Cited by the Examiner
UNITED STATES PATENTS

| | | | |
|---|---|---|---|
| 725,088 | 4/1903 | Johnston | 198—208 |
| 1,347,121 | 7/1920 | Rice | 128—208 |
| 2,700,859 | 2/1955 | Vigum et al. | 56—23 |

ABRAHAM G. STONE, *Primary Examiner.*

ANTONIO F. GUIDA, *Examiner.*